(12) United States Patent
Senriuchi et al.

(10) Patent No.: US 7,579,899 B2
(45) Date of Patent: Aug. 25, 2009

(54) CIRCUIT AND METHOD FOR TEMPERATURE DETECTION

(75) Inventors: Tadao Senriuchi, Tokyo (JP); Takeo Gokita, Tokyo (JP)

(73) Assignee: TDK Corporation, Tokyo (JP)

( * ) Notice: Subject to any disclaimer, the term of this patent is extended or adjusted under 35 U.S.C. 154(b) by 344 days.

(21) Appl. No.: 11/645,661

(22) Filed: Dec. 27, 2006

(65) Prior Publication Data
US 2007/0146047 A1   Jun. 28, 2007

(30) Foreign Application Priority Data
Dec. 28, 2005   (JP) .................... P2005-378886

(51) Int. Cl.
*H01L 35/00*   (2006.01)
(52) U.S. Cl. ..................... 327/512; 327/539
(58) Field of Classification Search ............... 327/512, 327/513, 539; 374/172, 173
See application file for complete search history.

(56) References Cited

U.S. PATENT DOCUMENTS

| | | | |
|---|---|---|---|
| 5,521,489 A | | 5/1996 | Fukami |
| 5,543,996 A | * | 8/1996 | Nakago .................... 361/90 |
| 6,531,911 B1 | * | 3/2003 | Hsu et al. ................. 327/512 |
| 6,628,558 B2 | * | 9/2003 | Fiscus ..................... 365/222 |
| 6,882,213 B2 | * | 4/2005 | Kim ........................ 327/512 |
| 6,946,825 B2 | | 9/2005 | Tesi |
| 7,084,695 B2 | * | 8/2006 | Porter ..................... 327/512 |
| 7,127,368 B2 | * | 10/2006 | Choi ....................... 702/130 |

FOREIGN PATENT DOCUMENTS

| JP | A-9-243467 | 9/1997 |
|---|---|---|
| JP | A 10-318849 | 12/1998 |

* cited by examiner

*Primary Examiner*—Lincoln Donovan
*Assistant Examiner*—Hai L Nguyen
(74) *Attorney, Agent, or Firm*—Oliff & Berridge, PLC

(57) ABSTRACT

A temperature detection circuit includes a temperature dependent voltage generation circuit for generating a temperature dependent voltage VR, a bandgap circuit for generating a temperature independent voltage VBG, and a comparator for comparing the temperature dependent voltage VR generated in the temperature dependent voltage generation circuit with the temperature independent voltage VBG generated in the bandgap circuit, and based on the above comparison result, outputting a temperature detection signal which indicates the high-low relationship between the temperature dependent voltage VR and the temperature independent voltage VBG. The above bandgap circuit includes an N-channel transistor source of which is connected to an input terminal of the comparator and supplies a current having a positive temperature characteristic, and an amplifier for driving gate of the N-channel transistor so that the source potential of the N-channel transistor is made to have a constant potential independent of the temperature of the measurement object.

10 Claims, 6 Drawing Sheets

CIRCUIT AND METHOD FOR TEMPERATURE DETECTION

BACKGROUND OF THE INVENTION

1. Field of the Invention

The present invention relates to a temperature detection circuit and a temperature detection method.

2. Related Background Art

Conventionally, a temperature detection circuit for detecting temperatures of a semiconductor chip, etc. has been known (for example, refer to the Japanese Patent Application Laid-open No. Hei-10-318849).

In the above temperature detection circuit, a current source having a positive temperature coefficient is connected in series to a current source having a negative temperature coefficient, and the voltage at the above connection point is compared with an inverter threshold voltage. Then, when the voltage based on the temperature at the connection point becomes higher than the threshold voltage, an inverter outputs a detection signal to the above effect.

SUMMARY OF THE INVENTION

However, in such the conventional temperature detection circuit, a temperature is detected based on the interrelationship between the current source having the positive temperature coefficient and the current source having the negative temperature coefficient. Therefore, for example, when the values supplied from both current sources are varied together, it becomes difficult to appropriately cope with the varied values, and as a result, it is difficult to detect the temperatures of the semiconductor chip, etc. with high accuracy.

Further, for example, in the case of a temperature detection circuit in which the output voltage of a bandgap circuit is used as threshold voltage, there is a varied output voltage of the bandgap circuit in a circuit configuration such that the output voltage of the bandgap circuit is easily influenced by the variation of the power supply voltage, particularly when the power supply voltage varies unstably. As a result, it becomes difficult to detect the temperatures of the semiconductor chip, etc. with high accuracy.

Accordingly, it is an object of the present invention to provide a temperature detection circuit and a temperature detection method capable of detecting the temperature of a temperature detection object with high accuracy.

Namely, the temperature detection circuit according to the present invention includes a temperature dependent voltage generation circuit for generating a temperature dependent voltage dependent on the temperature of a measurement object; a bandgap circuit for generating a temperature independent voltage independent of the temperature of the measurement object; and a comparator circuit for comparing the temperature dependent voltage generated in the temperature dependent voltage generation circuit with the temperature independent voltage generated in the bandgap circuit, and for outputting a temperature detection signal indicative of the high-low relationship between the temperature dependent voltage and the temperature independent voltage based on the comparison result. The above bandgap circuit includes an N-channel transistor, source of which is connected to an input terminal of the comparator circuit and supplies a current having a positive temperature characteristic; and a control circuit for driving gate of the N-channel transistor so that the source potential of the N-channel transistor is made to have a constant potential independent of the temperature of the measurement object According to such the temperature detection circuit in accordance with the present invention, the temperature dependent voltage generation circuit generates a voltage varied according to the temperature of the measurement object, and the bandgap circuit generates a constant voltage independent of the temperature of the measurement object Also, the comparator circuit relatively compares the temperature dependent voltage with the temperature independent voltage being used as a reference voltage. As such, because one of the two voltages being input into the comparator circuit is maintained at a constant value, the comparator circuit can compare the heights of both voltages with high accuracy, as compared to the exemplary case that both of the two input voltages are varied.

Further, according to the temperature detection circuit of the present invention, the bandgap circuit configures a feedback loop including the N-channel transistor, drain of which is connected to the power supply voltage, and the control circuit Here, because the N-channel transistor functions as a source follower, even in the exemplary case that the power supply voltage unstably varies, the voltage value between the gate and source can be maintained in a stable manner. With this, the bandgap circuit can generate a stable temperature independent voltage irrespective of the variation of the power supply voltage value. As a result, the temperature of the measurement object can be detected with high accuracy using the temperature detection circuit according to the present invention.

Further, preferably, the relationship between the temperature dependent voltage and temperature independent voltage is set such that the high-low relationship between the temperature dependent voltage and the temperature independent voltage is shifted when the temperature of the measurement object reaches a limit temperature of use.

In the above setting, a temperature detection signal being output from the comparator circuit is used as an input signal, for example, to a thermal protection circuit for the measurement object, and can be used, for example, as a decision criterion for preventing the measurement object from being damaged by overheating.

Further, preferably, the above bandgap circuit includes a first resistor one end of which is connected to the source of the N-channel transistor and the other end is connected to an input terminal of the control circuit; a second resistor one end of which is connected to the source of the N-channel transistor and the other end is connected to another input terminal of the control circuit; a third resistor one end of which is connected to the other input terminal of the control circuit; a first transistor emitter of which is connected to the input terminal of the control circuit, and collector and base of which are connected to a ground power supply; and a second transistor emitter of which is connected to the other end of the third resistor, and collector and base of which are connected to the ground power supply. Further, the bandgap circuit is configured such that the source potential of the N-channel transistor becomes a constant potential independent of the temperature of the measurement object, when the control circuit drives gate of the N-channel transistor so that voltages supplied to both input terminals of the control circuit become equal.

According to such the bandgap circuit, based on the circuit constants of the first resistor, the second resistor, the third resistor, the first transistor and the second transistor, a voltage having a constant value independent of the temperature of the measurement object can be generated for use as a reference voltage.

Further, preferably, the above temperature dependent voltage generation circuit includes a current mirror circuit for outputting a current having a predetermined ratio to the current value of a current supplied to the N-channel transistor; and a fourth one end resistor of which is connected to the output terminal of the current mirror circuit and the other end is connected to the ground power supply, and the output terminal of the current mirror circuit is connected to another input terminal of the comparator circuit.

According to the above circuit configuration, a temperature dependent voltage dependent on the temperature of the measurement object can be generated based on the setting of the current mirror circuit in addition to the circuit constants of the first resistor, the second resistor, the third resistor, the fourth resistor, the first transistor and the second transistor.

Further, preferably, the above N-channel transistor is configured of a first N-channel transistor and a second N-channel transistor, to which currents are supplied with a predetermined current division ratio, and drain of the second N-channel transistor is connected to an input terminal of the current mirror circuit. Further, the above current mirror circuit is configured of a first P-channel transistor and a second P-channel transistor, source and gate of which are mutually connected.

According to the above circuit configuration, by setting lower the current value supplied to the second N-channel transistor than the current value supplied to the first N-channel transistor, the second N-channel transistor and the transistor (the first P-channel transistor and the second P-channel transistor) configuring the current mirror circuit can be formed smaller in size than the first N-channel transistor. Thus, the occupation area of the temperature detection circuit can be reduced.

Further, the temperature detection method according to the is present invention includes a temperature dependent voltage generation step for generating a temperature dependent voltage dependent on the temperature of a measurement object; a temperature independent voltage generation step for generating a temperature independent voltage independent of the temperature of the measurement object; and a comparison step for comparing the temperature dependent voltage generated in the temperature dependent voltage generation step with the temperature independent voltage generated in the temperature independent voltage generation step, and for outputting a temperature detection signal indicative of the high-low relationship between the temperature dependent voltage and the temperature independent voltage based on the comparison result. Further, in the above temperature independent voltage generation step, there are employed an N-channel transistor for supplying a current having a positive temperature characteristic; and a bandgap circuit for driving the gate of the N-channel transistor so that the source potential of the N-channel transistor becomes a constant potential independent of the temperature of the measurement object. Also, in the above comparison step, the temperature independent voltage being output from the source is compared with the temperature dependent voltage.

According to the temperature detection method of the present invention, in the temperature dependent voltage generation step, a voltage varied with the temperature of the measurement object is generated, and also in the temperature independent voltage generation step, a constant voltage irrespective of the temperature of the measurement object is generated. Then, in the comparison step, the height of the temperature dependent voltage is relatively compared with the temperature independent voltage used as a reference voltage. As such, in the comparison step, because one of the two voltages to be compared is maintained at a constant value, the heights of both voltages can be compared with high accuracy, as compared to the exemplary case that both of the two voltages are varied.

Furthermore, the bandgap circuit employed in the temperature independent voltage generation step configures a feedback loop including the N-channel transistor and the control circuit Here, because the N-channel transistor functions as a source follower, even in the exemplary case that the power supply voltage unstably varies, the voltage value between the gate and source can be maintained in a stable manner. With this, through the temperature independent voltage generation step, a stable temperature independent voltage can be generated irrespective of the variation of the power supply voltage value. As a result, using the temperature detection method according to the present invention, the temperature of the measurement object can be detected with high accuracy.

According to the temperature detection circuit and the temperature detection method of the present invention, the temperature of the measurement object can be detected with high accuracy.

DESCRIPTION OF THE PREFERRED EMBODIMENTS

Figure 1:
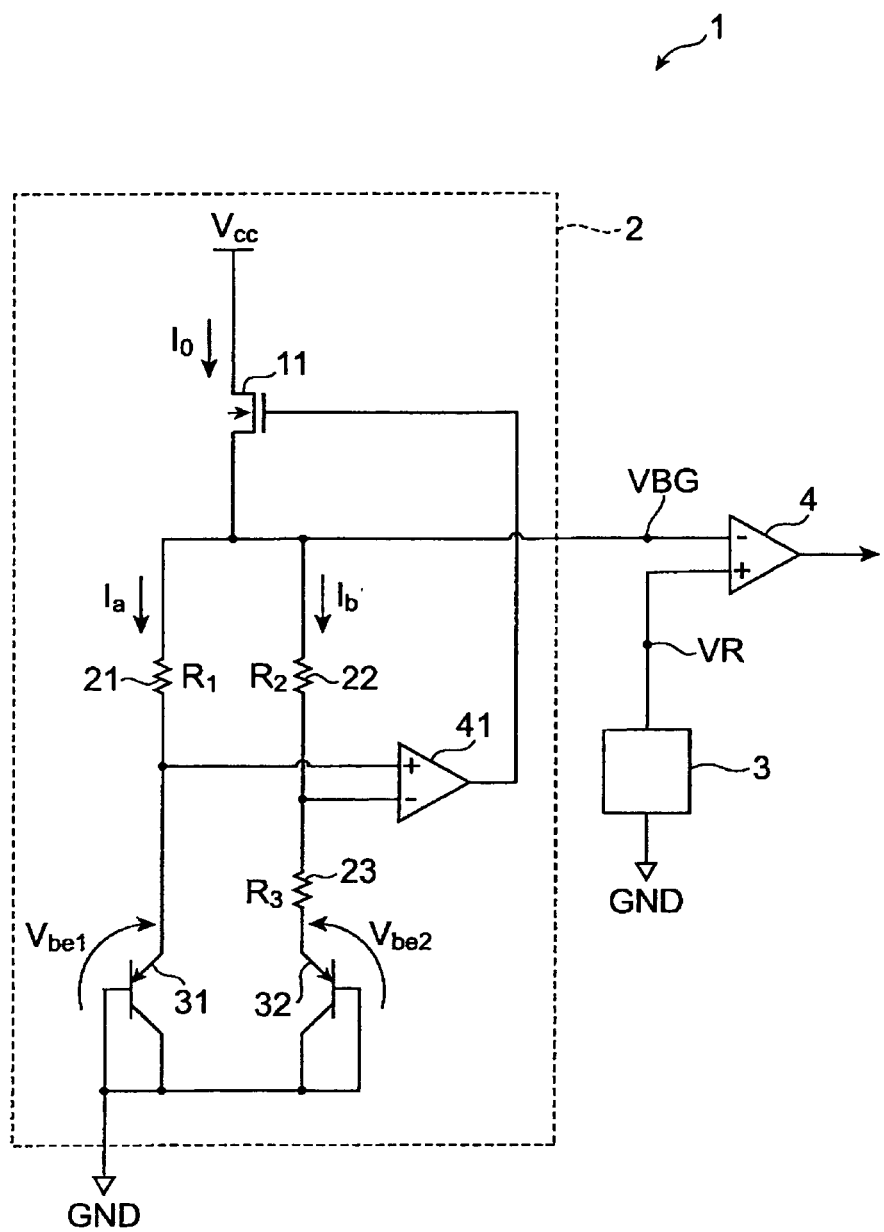
FIG. 1 shows a circuit diagram illustrating a temperature detection circuit 1 according to a first embodiment.

Hereinafter, preferred embodiments of a temperature detection circuit and a temperature detection method according to the present invention will be described in detail, referring to the drawings. Here, in the description of the drawings, identical symbols refer to identical parts or equivalent thereto, and duplicated description thereof is omitted.

First Embodiment

First, referring to FIG. 1, the configuration of the temperature detection circuit according to a first embodiment will be described. FIG. 1 shows a circuit diagram illustrating a temperature detection circuit 1 according to the first embodiment. A temperature detection circuit 1 in the first embodiment is either incorporated in a measurement object (for example, in case of a semiconductor chip), or installed in the vicinity of the measurement object, as a portion of a thermal protection circuit (not shown) for preventing the measurement object (not shown) from being damaged by overheating.

As shown in FIG. 1, the temperature detection circuit 1 includes a bandgap circuit 2, a temperature dependent voltage generation circuit 3 and a comparator (comparator circuit) 4. Hereinafter, each configuration element of the temperature detection circuit 1 will be described in detail.

The bandgap circuit 2 is provided for generating a temperature independent voltage VBG independent of the temperature of the measurement object, so as to output it to the comparator 4. The bandgap circuit 2 includes an N-channel MOS (Metal-Oxide Semiconductor) transistor (hereinafter, the N-channel MOS transistor is described as N-channel transistor) 11, a first resistor 21, a second resistor 22, a third resistor 23, a first transistor 31, a second transistor 32, and an amplifier (control circuit) 41.

The N-channel transistor 11 is provided for supplying a current having a positive temperature characteristic to the first transistor 31 and the second transistor 32, and configures a feedback loop together with the first resistor 21, the second resistor 22 and the amplifier 41. Namely, the drain of the N-channel transistor 11 is directly connected to a power supply voltage $V_{cc}$, and the source of the N-channel transistor 11 is connected to the input terminals of the amplifier 41 via the first resistor 21 and the second resistor 22, respectively, and the output terminal of the amplifier 41 is connected to the gate of the N-channel transistor 11. With such the configuration, the voltage value between the gate and source of the N-channel transistor has no direct relation to the voltage value of the power supply voltage $V_{cc}$. Accordingly, for example, even in case that the power supply voltage $V_{cc}$ varies unstably, the voltage value between the gate and source of the N-channel transistor operating as a source follower is maintained stably. Also, the source of the N-channel transistor 11 is connected to an inverted input terminal of the comparator 4, so that the output voltage VBG of the bandgap circuit 2 is applied to the comparator 4.

Meanwhile, in FIG. 1, in case that, for example, a P-channel MOS transistor (hereinafter, the P-channel MOS transistor is described as P-channel transistor) is used in place of the N-channel transistor, unintentionally, the P-channel transistor is operated as amplifier. As a result, the voltage value between the gate and source of the P-channel transistor is varied according to the variation of the power supply voltage $V_{cc}$, and the potential difference between the input terminals of the amplifier 41 becomes easily produced.

As to the first resistor 21, one end thereof is connected to the source of the N-channel transistor 11, while the other end is connected to both the non-inverted input terminal of the amplifier 41 and the emitter of the first transistor 31. Also, the second resistor 22 has one end connected to the source of the N-channel transistor 11, while the other end is connected to both the inverted input terminal of the amplifier 41 and one end of the third resistor. The third resistor 23 has one end connected to both the inverted input terminal of the amplifier 41 and the other end of the second resistor 22, while the other end is connected to the emitter of the second transistor 32.

The first transistor 31 has the emitter connected to the non-inverted input terminal of the amplifier 41, and also has the collector and base connected to a ground power supply GND. The second transistor 32 has the emitter connected to the other end of the third resistor, and also has the collector and base connected to the ground power supply GND. Additionally, the first transistor 31 and the second transistor 32 are configured of, for example, PNP bipolar transistors.

The amplifier 41 drives the gate of the N-channel transistor 11 so that the potential of the connection portion between the second resistor 22 and the third resistor 23 comes to have an equal value to the emitter potential of the first transistor 31 (namely, so that a current ratio of the current flowing through the first transistor 31 to the current flowing through the second transistor 32 becomes constant). In other words, as a control circuit, the amplifier 41 controls the output voltage being output from the output terminal so that the voltage supplied to the inverted input terminal and the voltage supplied to the non-inverted input terminal become equal. The non-inverted input terminal is connected to both the first resistor 21 and the emitter of the first transistor 31, while the inverted input terminal is connected to the second resistor 22 and the third resistor 23, and further, the output terminal is connected to the gate of the N-channel transistor 11.

The circuit constants of each configuration element of the bandgap circuit 2 described above are set such that the temperature independent voltage VBG becomes equal to the temperature dependent voltage VR being output from the temperature dependent voltage generation circuit 3, when the temperature measurement object is at a proper limit temperature of use.

The temperature dependent voltage generation circuit 3 is provided for generating the temperature dependent voltage VR dependent on the temperature of the measurement object, so as to output it to the comparator 4. Additionally, the temperature dependent voltage generation circuit 3 according to the first embodiment functions as a black box for inputting a signal representing the temperature of the measurement object from, for example, a means (not shown) for outputting the signal representing the temperature of the measurement object, generating the temperature dependent voltage VR corresponding to the above signal, and outputting the generated temperature dependent voltage. VR to the comparator 4. Here, it is sufficient if the temperature dependent voltage generation circuit 3 is a circuit for generating the temperature dependent voltage VR which increases or decreases depending on the temperature of the measurement object Therefore, it may be possible to configure the temperature dependent voltage generation circuit 3 using a semiconductor device or a resistor element having temperature dependence.

The comparator 4 is such a portion as inputting the temperature independent voltage VBG generated from the bandgap circuit 2 and the temperature dependent voltage VR generated from the temperature dependent voltage generation circuit 3, comparing the above two voltages, and based on the comparison result, outputting a temperature detection signal indicating a high-low relationship between the temperature independent voltage VBG and the temperature dependent voltage VR, that is, whether or not the temperature of the measurement object exceeds a limit temperature of use.

Figure 2:
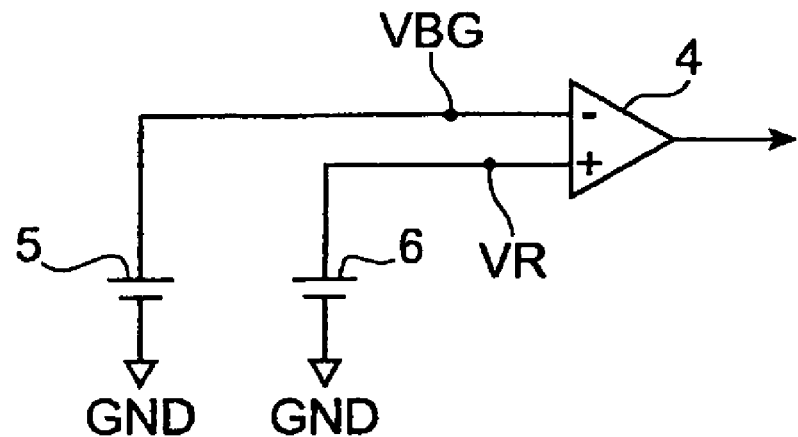
FIG. 2 shows a circuit diagram illustrating a circuit equivalent to the circuit shown in FIG. 1.

As shown in FIG. 2, it can be said that the temperature detection circuit 1 described above is equivalent to a circuit constituted of a comparator 4, a power supply 5 for applying the temperature independent voltage VBG to the inverted input terminal of the comparator 4, and a power supply 6 for applying the temperature dependent voltage VR to the non-inverted input terminal of the comparator 4.

Next, the operation of the temperature detection circuit 1 is described. In the bandgap circuit, since the amplifier 41 performs output control to make thee voltage applied to the inverted input terminal equal to that applied to the non-inverted input terminal, the following expression (1) is satisfied.

$$V_{be1} = I_b * R_3 + V_{be2} \quad (1)$$

where, $V_{be1}$: base-emitter voltage of the first transistor 31

$V_{be2}$: base-emitter voltage of the second transistor 32

$I_b$: current value of the current flowing through the second resistor 22, the third resistor 23 and the second transistor 32

$R_3$: resistance value of the third resistor 23

Therefore, the current value $I_b$ can be expressed in the following expression (2).

$$I_b = \frac{V_{be1} - V_{be2}}{R_3} \quad (2)$$

Here, the base-emitter voltage $V_{be1}$ of the first transistor 31 and the base-emitter voltage $V_{be2}$ of the second transistor 32 can be expressed in the following expressions (3) and (4).

$$V_{be1} = V_t * \ln\left(\frac{I_a}{I_{s1}}\right) \quad (3)$$

$$V_{be2} = V_t * \ln\left(\frac{I_b}{I_{s2}}\right) \quad (4)$$

where,
$V_t$: thermal voltage of the first transistor 31 and the second transistor 32
$I_a$: current value of the current flowing through the first resistor 21 and the first transistor 31
$I_{s1}$: current value of the saturation current of the first transistor 31
$I_{s2}$: current value of the saturation current of the second transistor 32

Here, the thermal voltage $V_t$ of the first transistor and the second transistor can be expressed in the following expression (5).

$$V_t = \frac{kT}{q} \quad (5)$$

where,
k: Bolzmann constant $(1.3806503*10^{\wedge}(-23)[J/K])$
T: absolute temperature
q: elementary charge of electron $(1.60*10^{\wedge}(-19)$ coulomb)

By substituting the expressions (3) and (4) for the expression (2), the current $I_b$ is expressed in the following expression (6).

$$I_b = \frac{V_t}{R_3} * \ln\left(M * \frac{I_{s2}}{I_{s1}}\right) \quad (6)$$

where, $$M = \frac{I_a}{I_b} \quad (7)$$

represents the ratio of the current value $I_a$ to the current value $I_b$.

In FIG. 1, the temperature independent voltage VBG applied to the inverted input terminal of the comparator 4 is expressed in the following expression (8).

$$VBG = V_{be1} + I_b * R_2 \quad (8)$$

By substituting the expression (6) for the expression (8), the temperature independent voltage VBG is finally expressed in the following expression (9).

$$VBG = V_{be1} + V_t * \frac{R_2}{R_3} * \ln\left(M * \frac{I_{s2}}{I_{s1}}\right) \quad (9)$$

The first term in the right-hand side of the expression (9) is the base-emitter voltage $V_{be1}$ of the first transistor 31, which has a negative thermal coefficient. On the other hand, the second term in the right-hand side of the expression (9) has a positive thermal coefficient based on the thermal voltage $V_t$. Therefore, by appropriately adjusting the resistance value $R_2$ of the second resistor 22, the resistance value $R_3$ of the third resistor 23, the ratio M of the current value $I_a$ to the current value $I_b$, and also the current value $I_{s1}$ of the saturation current of the first transistor 31 and the current value $I_{s2}$ of the saturation current of the second transistor 32, the temperature dependence in the first term of the right-hand side and the temperature dependence in the second term of the right-hand side are substantially canceled. As a result, it becomes possible to generate the temperature independent voltage VBG independent of the temperature of the measurement object.

The temperature independent voltage VBG thus generated is applied to the inverted input terminal of the comparator 4 (temperature independent voltage generation step). Also, the temperature dependent voltage VR generated in the temperature dependent voltage generation circuit 3 is applied to the non-inverted input terminal of the comparator 4 (temperature dependent voltage generation step). The comparator 4 then compares to obtain the high-low relationship between the input temperature independent voltage VBG and the temperature dependent voltage VR. As a result of the comparison, when the high-low relationship is shifted, the comparator 4 outputs a temperature detection signal indicative of a shift in the high-low relationship between the actual temperature and the limit temperature of use of the measurement object (comparison step).

Figure 3:
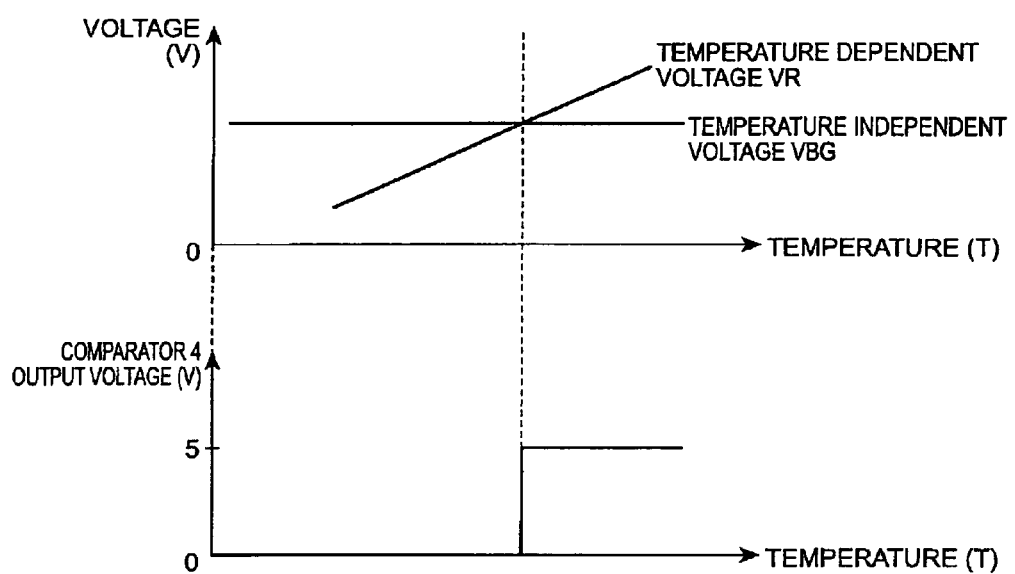
FIG. 3 shows a graph illustrating the operation of a comparator 4.

FIG. 3 shows a graph illustrating the operation of comparator 4. The comparator 4 outputs a low-level temperature detection signal (for example, an output voltage of 0 V) when the temperature dependent voltage VR does not exceed the temperature independent voltage VBG, and outputs a high-level temperature detection signal (for example, an output voltage of 5 V) when the temperature dependent voltage VR exceeds the temperature independent voltage VBG. Then, for example, the output signal from the comparator 4 is input into a thermal protection circuit, and used as a decision criterion in terminal control. As described above, because the temperature independent voltage VBG is set to fit to the limit temperature of use of the temperature measurement object, it can be said that the temperature dependent voltage VR exceeds the temperature independent voltage VBG, resulting in outputting the high-level temperature detection signal from the comparator 4, is equivalent to that the temperature of the measurement object exceeds the limit temperature of use.

Next, the function and the effect of the first embodiment are described. According to the temperature detection circuit 1 and the temperature detection method in accordance with the first embodiment, the temperature dependent voltage generation circuit 3 generates a voltage varied with the temperature of the measurement object, and the bandgap circuit 2 generates a constant voltage, irrespective of the temperature of the measurement object. Then, the comparator 4 compares the heights of the temperature dependent voltage VR and the temperature independent voltage VBG being used as a reference voltage. As such, because one of the two voltages being input to the comparator 4 is maintained at a constant value, the comparator 4 can compare the heights between the both voltages with high accuracy, as compared to the exemplary case that both of the two input voltages are varied.

Further, according to the temperature detection circuit 1 and the temperature detection method in accordance with the first embodiment, the bandgap circuit 2 configures a feedback loop including the N-channel transistor 11, drain of which is directly connected to the power supply voltage $V_{cc}$, and the amplifier 41. Here, because the N-channel transistor 11 functions as a source follower, even in the exemplary case that the power supply voltage $V_{cc}$ varies unstably, the voltage value between the gate and source is maintained in a stable manner, and a potential difference between the input terminals of the amplifier 41 becomes hard to occur. With this, the bandgap circuit 2 can generate a stable temperature independent voltage VBG irrespective of the variation of the power supply voltage value. As a result, using the temperature detection circuit 1 according to the present invention, the temperature of the measurement object can be detected with high accuracy.

Further, the temperature detection signal being output from the comparator 4 is used as an input signal to, for example, a thermal protection circuit of the measurement object, and can be used, for example, as a decision criterion for preventing the measurement object from being damaged by overheating.

Also, based on the circuit constants of the first resistor 21, the second resistor 22, the third resistor 23, the first transistor 31 and the second transistor 32, it is possible to generate a voltage having a constant value independent of the temperature of the measurement object, for use as a reference voltage.

Second Embodiment

Figure 4:
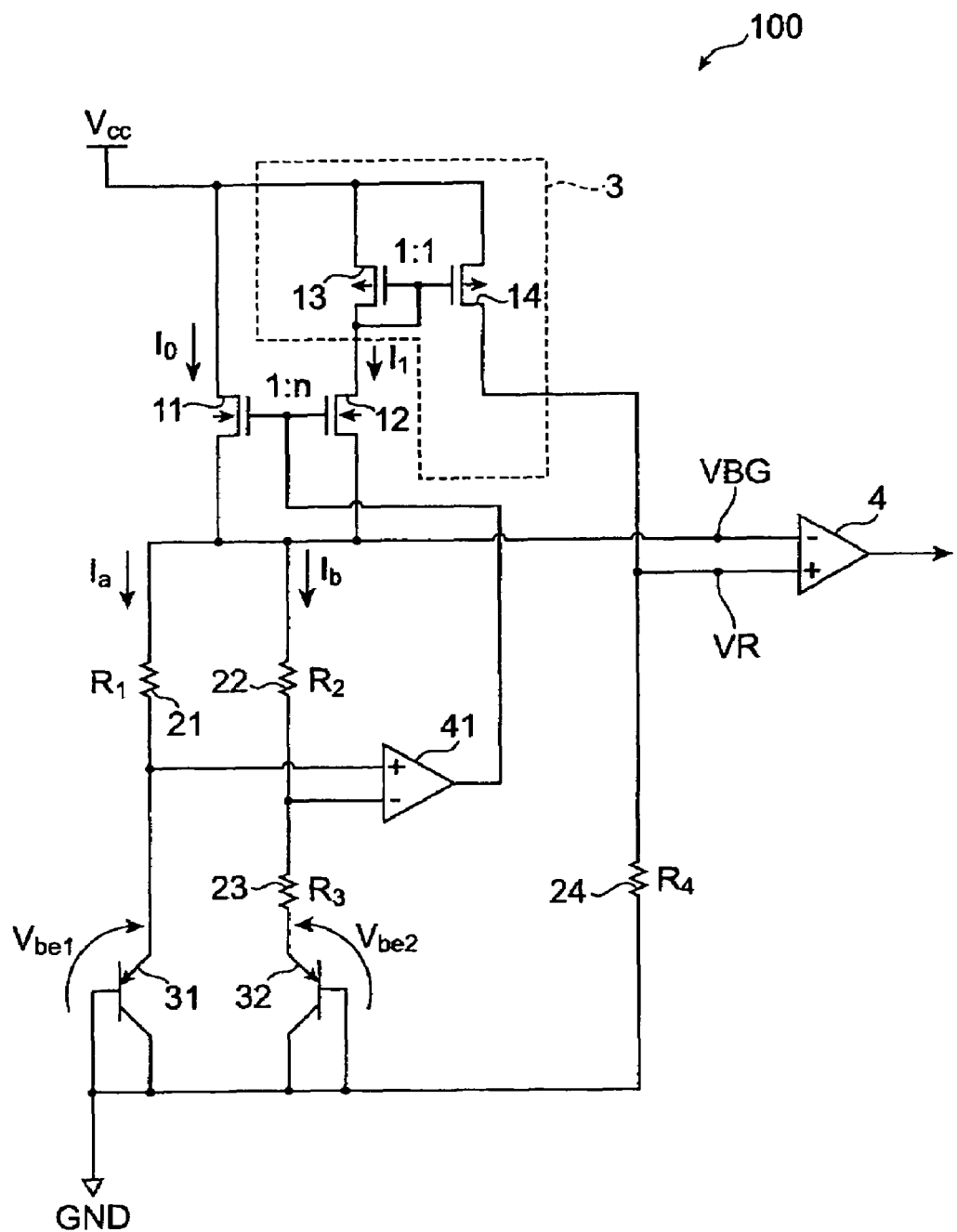
FIG. 4 shows a circuit diagram illustrating a temperature detection circuit 100 according to a second embodiment.

Next, referring to FIG. 4, the configuration of the temperature detection circuit in regard to a second embodiment is described. FIG. 4 shows a circuit diagram illustrating a temperature detection circuit 100 according to the second embodiment In the following description, as for the portions duplicated with the first embodiment, the description thereof is omitted.

As shown in FIG. 4, the temperature detection circuit 100 includes a second N-channel transistor 12, a first P-channel transistor 13, a second P-channel transistor 14 and a fourth resistor 24. Additionally, in the following, an N-channel transistor 11 is described as a first N-channel transistor 11. Hereinafter, each configuration elements of temperature detection circuit 100 is described in detail.

The gate of the second N-channel transistor 12 is connected to the gate of the first N-channel transistor 11 and the output terminal of an amplifier 41. The source of the second N-channel transistor 12 is connected to the source of the first N-channel transistor 11, one end of a first resistor 21, one end of a second resistor 22, and an inverted input terminal of a comparator 4. The drain of the second N-channel transistor 12 is connected to the drain of the first P-channel transistor 13. Accordingly, together with the first N-channel transistor 11, the second N-channel transistor 12 configures a current mirror, and a current having a positive temperature characteristic being supplied to the first N-channel transistor 11 is flow divided to the first N-channel transistor 11 and the second N-channel transistor 12 with a predetermined current division ratio.

Since the first P-channel transistor 13 is disposed in the identical current path to the second N-channel transistor 12, an identical current to the second N-channel transistor 12 flows in the first P-channel transistor 13. The drain of the first P-channel transistor 13 is connected to the drain of the second N-channel transistor 12. The gate of the first P-channel transistor 13 is connected to both the drain of the own transistor and the gate of the second P-channel transistor 14. The sources of the first P-channel transistor and the second P-channel transistor 14 are connected to a power supply voltage $V_{cc}$. The drain of the second P-channel transistor 14 is connected to a non-inverted input terminal of the comparator 4 and one end of the fourth resistor 24.

The first P-channel transistor 13 and the second P-channel transistor 14 configure a current mirror, and to the fourth resistor 24 connected to the drain of the second P-channel transistor 14, which is the output terminal of the current mirror circuit, there is a current flow having a certain ratio to a current having a positive temperature characteristic supplied to the bandgap circuit (a current in which the current supplied to the first N-channel transistor 11 is added to the current supplied to the second N-channel transistor 12). Accordingly, between both terminals of the fourth resistor 24, there is generated a temperature dependent voltage VR based on the current having a positive temperature characteristic which is output from the output terminal of the current mirror circuit.

Also, by setting the current value of the current supplied to the second N-channel transistor 12 smaller than that of the current supplied to the first N-channel transistor 11, it becomes possible to lessen the current value of the current flowing in the current mirror circuit. As a result, the first P-channel transistor 13 and the second P-channel transistor 14 configuring the current mirror circuit can be miniaturized.

As shown in FIG. 2, it can be said that the temperature detection circuit 100 described above is equivalent to a circuit configured of a comparator 4, a power supply 5 for applying the temperature independent voltage VBG to the inverted input terminal of the comparator 4, and a power supply 6 for applying the temperature dependent voltage VR to the non-inverted input terminal of the comparator 4.

Next, the operation of the temperature detection circuit 100, in particular, the operation of the temperature dependent voltage generation circuit 3 is described. In FIG. 4, let n as a ratio of the current value $I_1$ of the current flowing in the second N-channel transistor 12 to the current value $I_0$ of the current flowing in the first N-channel transistor 11, then the following expression (10) is satisfied.

$$I_1 = n * I_0 \tag{10}$$

Also, the temperature dependent voltage VR can be expressed in the following expression (11).

$$VR = I_1 * R_4 \tag{11}$$

where, $R_4$: resistance value of the fourth resistor 24

Namely, the temperature dependent voltage VR is expressed in the following expression (12).

$$VR = n * I_0 * R_4 \tag{12}$$

Further, in FIG. 4, the following expression (13) is satisfied.

$$I_0 + I_1 = I_a + I_b \tag{13}$$

By substituting the expressions (10) and (7) for the expression (13), the current value $I_0$ of the current flowing in the first N-channel transistor 11 is expressed in the following expression (14).

$$I_0 = \frac{M+1}{n+1} * I_b \tag{14}$$

Accordingly, by substituting the expressions (14) and (6) for the expression (12), the temperature dependent voltage VR is expressed in the following expression (15).

$$VR = V_t * \frac{R_4}{R_3} * \frac{n(M+1)}{n+1} * \ln\left(M * \frac{I_{s2}}{I_{s1}}\right) \quad (15)$$

Here, since the temperature coefficient of the third resistor 23 is set to be equal to the temperature coefficient of the fourth resistor 24, the temperature dependence of the third resistor 23 and the temperature dependence of the fourth resistor 24 are mutually canceled. Also, since the temperature coefficient of the saturation current of the first transistor 31 is set to be equal to the temperature coefficient of the saturation current of the second transistor 32, the temperature dependence of the saturation current of the first transistor 31 and the temperature dependence of the saturation current of the second transistor 32 are mutually canceled. Accordingly, the temperature dependent voltage VR shown in the expression (15) has a positive temperature coefficient based on the thermal voltage $V_t$. Therefore, by appropriately adjusting the resistance value $R_3$ of the third resistor 23, the resistance value $R_4$ of the fourth resistor 24, the ratio n of the current value $I_1$ to the current value $I_0$, the ratio M of the current value $I_a$ to the current value $I_b$, the current value $I_{s1}$ of the saturation current of the first transistor 31, and the current value $I_{s2}$ of the saturation current of the second transistor 32, there is generated the temperature dependent voltage VR in which the high-low relationship between the temperature dependent voltage VR and the temperature independent voltage VBG is shifted at a predetermined limit temperature of use.

The temperature dependent voltage VR thus generated is applied to the non-inverted input terminal of the comparator 4 (temperature dependent voltage generation step). Also, the temperature independent voltage VBG is applied to the inverted input terminal of the comparator 4 (temperature independent voltage generation step). The comparator 4 then compares to obtain the high-low relationship between the temperature dependent voltage VR and the input temperature independent voltage VBG As a result of the comparison, when the high-low relationship is shifted, the comparator 4 outputs a temperature detection signal indicative of a shift in the high-low relationship between the actual temperature and the limit temperature of use of the measurement object (comparison step). Then, the comparator 4 performs such operation as shown in FIG. 3.

Next, the function and the effect of the second embodiment are described. Since it is configured to output from the current mirror circuit a current with a constant ratio to the current supplied to the bandgap circuit, having a positive temperature characteristic, the temperature dependent voltage VR can easily be generated based on the above current. Also, by appropriately adjusting the resistance value $R_2$ of the second resistor 22, the resistance value $R_3$ of the third resistor 23, the resistance value $R_4$ of the fourth resistor 24, the ratio n of the current value $I_1$ to the current value $I_0$, the ratio M of the current value $I_a$ to the current value $I_b$, the current value $I_{s1}$ of the saturation current of the first transistor 31, and the current value $I_{s2}$ of the saturation current of the second transistor 32, it is possible to appropriately set a temperature at which the high-low relationship between the temperature dependent voltage VR and the temperature independent voltage VBG is shifted.

Further, by setting the current value supplied to the second N-channel transistor 12 smaller (n<1) than the current value supplied to the first N-channel transistor 11, it becomes possible to miniaturize the second N-channel transistor 12, the first P-channel transistor 13 and the second P-channel transistor 14. Thus, the occupation area of the temperature detection circuit 100 can be reduced.

Additionally, the temperature detection circuit and the temperature detection method according to the present invention are not limited to the above embodiments, needless to say. For example, in the above embodiments, PNP bipolar transistors are employed as the first transistor and the second transistor. However, it may be possible to employ a forward-direction diode in place of the PNP bipolar transistor.

Also, according to the above embodiments, although the ratio of the current value of the current flowing in the first P-channel transistor 13 to the current value of the current flowing in the second P-channel transistor 14 is set to 1,it may be possible to set a predetermined ratio of 1 or less.

Figure 5:
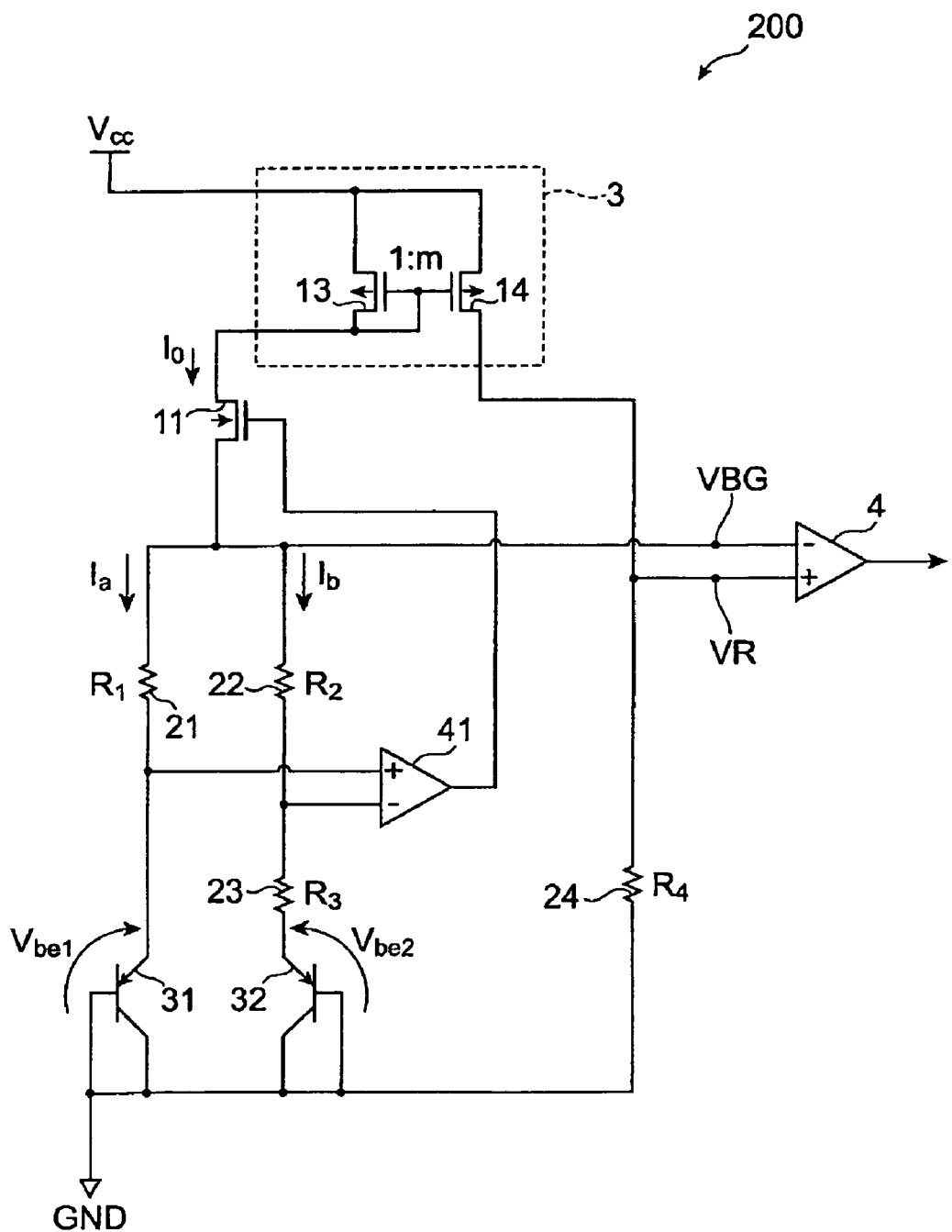
FIG. 5 shows a circuit diagram illustrating a temperature detection circuit 200 partially modified from the second embodiment.

Further, as the temperature detection circuit 200 shown in FIG. 5, even by connecting the drain of the first P-channel transistor 13, as the input terminal of the current mirror circuit, to the drain of the first N-channel transistor 11, a current having a constant ratio to the current supplied to the bandgap circuit, having a positive temperature characteristic (i.e. the current supplied to the first N-channel transistor 11), is supplied to the fourth resistor 24 which is connected to the drain of the second P-channel transistor 14, as the output terminal of the current mirror circuit. Accordingly, the temperature dependent voltage VR is generated similarly to the case of the temperature detection circuit 100 in the second embodiment. Here, it is not possible to miniaturize the first P-channel transistor 13 because a current identical to the current flowing in the first N-channel transistor 11 flows in the first P-channel transistor 13. However, by setting to be m<1,where the ratio of a current flowing in the first P-channel transistor 13 to a current flowing in the second P-channel transistor 14 is let to be 1:m, it becomes possible to miniaturize the second P-channel transistor 14.

Also, although the MOS transistors are employed in the above embodiments as the N-channel transistors or the P-channel transistors, other field effect transistors may be applicable.

Figure 6:
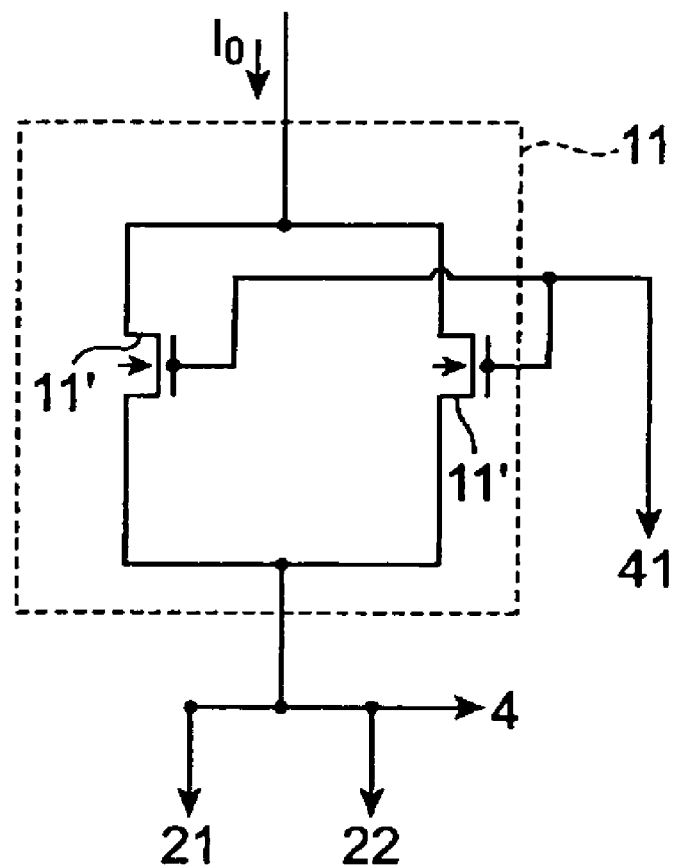
FIG. 6 shows a diagram illustrating one transistor example.

FIG. 6 shows one example of a transistor. As shown in the above figure, the aforementioned N-channel transistor 11 may be configured of two or more N-channel transistors 11'in parallel connection.

What is claimed is:

1. A temperature detection circuit comprising:
a temperature dependent voltage generation circuit for generating a temperature dependent voltage dependent on the temperature of a measurement object;
a bandgap circuit for generating a temperature independent voltage independent of the temperature of the measurement object; and
a comparator circuit for comparing the temperature dependent voltage generated in the temperature dependent voltage generation circuit with the temperature independent voltage generated in the bandgap circuit, and for outputting a temperature detection signal indicative of the high-low relationship between the temperature dependent voltage and the temperature independent voltage based on the comparison result,
wherein the bandgap circuit includes:
an N-channel transistor, source of which is connected to an input terminal of the comparator circuit and supplies a current having a positive temperature characteristic; and
a control circuit for driving gate of the N-channel transistor so that the source potential of the N-channel transistor is made to have a constant potential independent of the temperature of the measurement object.

2. The temperature detection circuit according to claim 1,
wherein the relationship between the temperature dependent voltage and the temperature independent voltage is set such that the high-low relationship between the temperature dependent voltage and the temperature independent voltage is shifted when the temperature of the measurement object reaches a limit temperature of use.

3. The temperature detection circuit according to claim 1,
wherein the bandgap circuit includes:
a first resistor one end of which is connected to the source of the N-channel transistor and the other end is connected to an input terminal of the control circuit;
a second resistor one end of which is connected to the source of the N-channel transistor and the other end is connected to another input terminal of the control circuit;
a third resistor one end of which is connected to the another input terminal of the control circuit;
a first transistor emitter of which is connected to the input terminal of the control circuit, and collector and base of which are connected to a ground power supply; and
a second transistor emitter of which is connected to the other end of the third resistor, and collector and base of which are connected to the ground power supply.

4. The temperature detection circuit according to claim 3,
wherein, when the control circuit drives the gate of the N-channel transistor so that voltages supplied to both input terminals of the control circuit become equal, the bandgap circuit is configured such that the source potential of the N-channel transistor becomes a constant potential independent of the temperature of the measurement object.

5. The temperature detection circuit according to claim 1,
wherein the temperature dependent voltage generation circuit includes:
a current mirror circuit for outputting a current having a predetermined ratio to the current value of a current supplied to the N-channel transistor; and
a fourth resistor one end of which is connected to the output terminal of the current mirror circuit and the other end is connected to the ground power supply, and
wherein the output terminal of the current mirror circuit is connected to another input terminal of the comparator circuit.

6. The temperature detection circuit according to claim 5,
wherein the N-channel transistor is configured of a first N-channel transistor and a second N-channel transistor, to which currents are supplied with a predetermined current division ratio, and
wherein drain of the second N-channel transistor is connected to an input terminal of the current mirror circuit.

7. The temperature detection circuit according to claim 5,
wherein the current mirror circuit is configured of a first P-channel transistor and a second P-channel transistor, sources and gates of which are mutually connected.

8. The temperature detection circuit according to claim 5,
wherein the N-channel transistor is configured of two N-channel transistors or more being connected in parallel.

9. The temperature detection circuit according to claim 1,
wherein the N-channel transistor is configured of two N-channel transistors or more being connected in parallel.

10. A temperature detection method comprising:
a temperature dependent voltage generation step for generating a temperature dependent voltage dependent on the temperature of a measurement object;
a temperature independent voltage generation step for generating a temperature independent voltage independent of the is temperature of the measurement object; and
a comparison step for comparing the temperature dependent voltage generated in the temperature dependent voltage generation step with the temperature independent voltage generated in the temperature independent voltage generation step, and for outputting a temperature detection signal indicative of the high-low relationship between the temperature dependent voltage and the temperature independent voltage based on the comparison result,
wherein, in the temperature independent voltage generation step, there are employed:
an N-channel transistor for supplying a current having a positive temperature characteristic; and
a bandgap circuit for driving gate of the N-channel transistor so that source potential of the N-channel transistor becomes a constant potential independent of the temperature of the measurement object, and
wherein in the comparison step, the temperature independent voltage being output from the source is compared with the temperature dependent voltage.

* * * * *